United States Patent [19]
Tachi

[11] Patent Number: 5,543,868
[45] Date of Patent: Aug. 6, 1996

[54] METHOD AND APPARATUS OF REPRODUCING A DIGITAL SIGNAL RECORDED ON A MOVIE FILM

[75] Inventor: Katsuichi Tachi, Kanagawa, Japan

[73] Assignee: Sony Cinema Products Corporation, Culver City, Calif.

[21] Appl. No.: 247,581

[22] Filed: May 23, 1994

[30] Foreign Application Priority Data

May 25, 1993 [JP] Japan .................................. 5-122645

[51] Int. Cl.⁶ .................................................. G03B 31/02
[52] U.S. Cl. ............................................................. 352/27
[58] Field of Search ...................... 352/26, 27, 28, 352/31, 37, 233

[56] References Cited

U.S. PATENT DOCUMENTS

| | | |
|---|---|---|
| 2,200,106 | 5/1940 | Steube . |
| 2,347,084 | 4/1944 | Cooney . |
| 2,485,829 | 10/1949 | Holst et al. . |
| 3,502,398 | 3/1970 | Michelson . |
| 3,806,643 | 4/1974 | Russell ........................... 178/6.7 R |
| 3,915,566 | 10/1975 | Fisher . |
| 3,932,032 | 1/1976 | Weinstein . |
| 3,964,826 | 6/1976 | Joseph et al. . |
| 3,973,839 | 8/1976 | Stumpf et al. . |
| 4,027,958 | 6/1977 | Shigeta et al. . |
| 4,074,085 | 2/1978 | Russell . |
| 4,085,296 | 4/1978 | Keegan ........................... 179/100.3 R |
| 4,124,784 | 11/1978 | Johnson et al. . |
| 4,202,018 | 5/1980 | Stockham, Jr. . |
| 4,215,920 | 8/1980 | Butler . |
| 4,223,188 | 9/1980 | Dolby . |
| 4,256,389 | 3/1981 | Engebretson . |
| 4,306,781 | 12/1981 | Mosely . |
| 4,355,383 | 10/1982 | Dolby . |
| 4,404,427 | 9/1983 | Blackmer . |
| 4,461,552 | 7/1984 | Levine . |
| 4,491,399 | 1/1985 | Bell . |
| 4,553,833 | 11/1985 | Kanaoka et al. . |
| 4,577,302 | 3/1986 | Allen . |
| 4,589,129 | 5/1986 | Blackmer et al. . |
| 4,600,280 | 7/1986 | Clark . |
| 4,603,099 | 7/1986 | Drexler . |
| 4,622,598 | 11/1986 | Doi et al. . |
| 4,659,198 | 4/1987 | Beauviala et al. ........................ 352/92 |
| 4,680,796 | 7/1987 | Blackmer et al. . |
| 4,691,112 | 9/1987 | Wydler . |
| 4,706,287 | 11/1987 | Blackmer et al. . |
| 4,758,485 | 7/1988 | Drexler . |
| 4,870,633 | 9/1989 | Matsushita et al. . |
| 4,893,921 | 1/1990 | Beauviala . |
| 4,962,432 | 10/1990 | Ohtsuka et al. . |
| 5,088,813 | 2/1992 | Wakefield . |
| 5,101,096 | 3/1992 | Ohyama et al. . |
| 5,155,510 | 10/1992 | Beard ........................ 352/27 |
| 5,164,574 | 11/1992 | Ujiie et al. . |
| 5,231,627 | 7/1993 | Paul et al. . |
| 5,237,559 | 8/1993 | Murphy et al. . |

*Primary Examiner*—Russell E. Adams
*Assistant Examiner*—Christopher E. Mahoney
*Attorney, Agent, or Firm*—William S. Frommer; Alvin Sinderbrand

[57] ABSTRACT

A method and apparatus for optically reading or reproducing digital information recorded as a plurality of pits on at least one track of a movie film. A linear light source having a plurality of light elements, such as LED's, is arranged such that light from at least one of the light elements is irradiated on each of the pits. The light or optical beam from the linear light source is transmitted through the pits of the movie film and received by a light receiving element, such as a photodiode, having a single light receiving portion. The light elements of the linear light source are lit sequentially so that the digital information recorded in each line of each track may be read out at a pit unit by the light receiving element.

6 Claims, 7 Drawing Sheets

METHOD AND APPARATUS OF REPRODUCING A DIGITAL SIGNAL RECORDED ON A MOVIE FILM

BACKGROUND OF THE INVENTION

1. Field of the Invention

The present invention relates to a technique for reproducing digital information, such as digital audio information, from a motion picture or movie film.

2. Description of the Prior Art

A movie film typically includes a plurality of graphic frames and an analog audio track. Analog audio information, which relates to a respective one or ones of the graphic frames, is recorded in the analog audio track. One example of a portion of such movie film is illustrated in FIG. 5.

The portion of a movie film 1 shown in FIG. 5 includes a graphic frame 2, a plurality of perforations 3 and an analog audio track 4. The plurality of perforations 3 are arranged with a substantially equal pitch in the vicinity of each of the righthand and lefthand sides of the movie film 1 and on opposite sides of the graphic frame 2. Such perforations 3 are utilized for transporting or taking up the movie film 1 in a predetermined direction by a transport mechanism (not shown). The analog audio track 4 is located in a portion of one side of the movie film 1, such as the portion between the graphic frame 2 and the righthand side perforations 3. Analog audio information is recorded in the analog audio track 4 in a longitudinal direction. Such analog audio information may be optically read out and converted into an audio signal.

Recently, to improve the sound quality of audio information reproduced from a movie film, a movie film has been developed in which analog audio information and digital audio information having the same content may be recorded thereon. One reason for the use of analog audio information in such movie film is to ensure compatibility with existing systems which may only be able to reproduce analog audio information and not digital audio information. One example of a portion of such movie film is illustrated in FIG. 6.

The portion of a movie film 100 shown in FIG. 6 includes a graphic frame 102, a plurality of perforations 103 and an analog audio track 104, which are substantially similar to those of FIG. 5. The movie film 100 further includes a first digital audio track 105 and/or a second digital audio track 106, which are located in a spare region or regions of the movie film. More specifically, the spare region for the first digital audio track 105 is a longitudinal spare region located between the lefthand perforations 103 and a lefthand film edge 100a and the spare region for the second digital audio track 106 is a longitudinal spare region located between the righthand perforations 103 and a righthand film edge 100b. Digital audio information may be recorded in either or both of the first and second digital audio tracks 105 and 106, respectively.

As is to be appreciated, the movie film 100 typically has a film running direction A, which is substantially perpendicular to a horizontal direction H.

Although FIG. 6 illustrates both the first and second digital audio tracks 105 and 106, respectively, the movie film 100 may have only one of such digital audio tracks, as previously described. Alternatively, only one of these digital audio tracks may be utilized to record digital audio information therein.

Each of the first and second digital audio tracks 105 and 106, respectively, may be utilized to record four channels of right and left digital audio signals therein. Accordingly, by utilizing both the first and second digital audio tracks 105 and 106, respectively, four channels of right and left digital audio signals, for a total of eight channels, may be recorded therein.

An example of the audio signals recorded as digital information is shown in FIG. 7A. As shown therein, such recorded digital information is formed as a plurality of data cells or so-called pits 7 having a predetermined shape, such as the square shape shown in FIG. 7A. Each such pit 7 corresponds to one bit of digital information. The pits 7 are typically arranged in a plurality of rows in which each of the rows is horizontally arranged such as in the horizontal direction H in the digital audio track which is substantially perpendicular to the film running direction A.

Since the recorded digital information is normally optically read out as hereinafter more fully described, the pits 7 may have dichroic (or density) information recorded therein so as to affect the transmissivity of light through the respective digital audio track of the movie film 100. As a result, relatively low "0" and relatively high "1" digital bits may be readily distinguished. An example of such situation is illustrated in FIG. 7A, wherein the hatched pits correspond to the digital 0 bit whereas the blank pits correspond to the digital 1 bit.

The audio information recorded in the analog audio track 104 and the first and/or second digital audio tracks 105 and 106, respectively, of the movie film 100 may be read out or reproduced therefrom. FIG. 8 illustrates an apparatus 10 for reproducing digital audio information, such as that recorded in the first and second digital audio tracks 105 and 106. An apparatus for reproducing the analog audio signals, such as those recorded in the analog audio track 104, is well known and, thus, will not be described herein.

As shown in FIG. 8, the reproducing apparatus 10 includes a light source or a halogen lamp 11, a lens 12, a linear light receiving element or line sensor 13 of a charge coupled device (CCD), a filter 14, an equalizer 15, a comparator 16, a clock extractor 17, a data extractor 18, and a driver 20. Such apparatus 10 will be described below.

An optical beam from the halogen lamp 11 is guided through the lens 12 so as to irradiate the first digital audio track 105 (or second digital audio track 106) of the movie film 100. As a result, the beam is modulated by the pit information recorded in the digital audio track 105. The modulated beam is focused on the linear light receiving element or line sensor 13 of the CCD, or similar such device, so that the digital information (or pit column information) may be read out and converted into corresponding electrical signals. Since the movie film 100 is advanced or taken up in a direction A indicated in FIG. 6, which is normal to the drawing surface, the light receiving element 13 reads out digital audio information in line units.

The signals from the light receiving element 13 are supplied through the filter 14 so as to restrict the working frequency band thereof (such filter may be a low pass filter) and the equalizer 15 so as to equalize the received signals. After which, the "1" and "0" signals, corresponding to the read pits 7, from the equalizer 15 are supplied to the comparator 16 so as to be compared with a reference level. Pit column signals from the comparator 16 are supplied to the clock extractor 17 to extract or reproduce clock signals therefrom. The signals from the comparator 16 are further supplied to the data extractor 18 to extract or reproduce audio signals therefrom.

The driver 20 for the light source 11 includes a power source 21, a regulator 22 and a fan 23. As shown in FIG. 8, an AC power signal is supplied to the power source 21 and transformed thereat into a predetermined AC voltage. The AC voltage from the power source 21 is stabilized by the regulator 22, and a stabilized AC voltage therefrom is supplied to the halogen lamp 11 so as to cause the halogen light to be lit. By stabilizing the AC voltage, the optical intensity of the halogen light 11 is stabilized. Since the halogen lamp 11 generates a relatively large amount of heat while in a running mode, the cooling fan 23 is provided so as to remove some of this heat.

As previously described, the reproducing apparatus 10 typically utilizes a halogen lamp, or similar such device, for the light source 11. Such halogen lamp has a relatively short operating life, that is, approximately 50 hours. Additionally, such halogen lamp is relatively expensive.

Further, to drive the halogen lamp 11, the driver 20 includes not only the power source circuit 21 but also the regulator 22 and the fan 23, as previously described. As is to be appreciated, the peripheral circuits associated therewith are relatively complicated. As a result, the driver 20 is relatively expensive and has a relatively large-size, thereby causing the apparatus 10 to be relatively expensive and to have a relatively large size.

Furthermore, the CCD, of the linear light receiving element 13, has to be exemplified by a one-dimensional sensor. Accordingly, the cost of such linear light receiving element is relatively high.

Thus, the prior art has failed to provide an apparatus for reproducing digital information from a movie film having a light source with a relatively long life, a relatively simple peripheral circuit(s) associated with the light source, and which has a relatively low cost.

OBJECTS AND SUMMARY OF THE INVENTION

An object of the present invention is to provide a technique for reproducing digital audio information from a movie film which overcomes the problems associated with the prior art.

More specifically, it is an object of the present invention to provide a technique for reproducing digital audio information from a movie film which utilizes a linear light source having a relatively long operating life.

Another object of the present invention is to provide a technique for reproducing digital audio information from a movie film as aforesaid which further utilizes a single light receiving device for receiving light from the linear light source through the movie film.

A further object of the present invention is to provide a technique for reproducing digital audio information from a movie film as aforesaid in which the linear light source includes a plurality of light emitting diodes.

A still further object of the present invention is to provide a technique for reproducing digital audio information from a movie film as aforesaid in which the light receiving device is a photodetector.

Yet another object of the present invention is to provide a technique for reproducing digital audio information from a movie film as aforesaid in which the linear light source and the light receiving device are relatively inexpensive.

A still further object of the present invention is to provide a technique for reproducing digital audio information from a movie film as aforesaid which utilizes circuitry for driving the linear light source having a relatively simple construction, a relatively small size and is relatively inexpensive.

In accordance with an aspect of the present invention, an apparatus for reproducing a digital signal recorded as a plurality of pits having respective transmissivity on a motion picture film is provided. The apparatus comprises a linear light source having a plurality of light elements aligned in a predetermined manner such that light from at least one of the light elements is irradiated on each of the pits; a device for sequentially lighting each of the light elements of the linear light source; and a light receiving device located on a side of the motion picture film opposite the linear light source for receiving the light from the linear light source through the motion picture film and for converting the received light into a corresponding electrical signal.

Other objects, features and advantages according to the present invention will become apparent from the following detailed description of an illustrated embodiment when read in conjunction with the accompanying drawings in which corresponding components are identified by the same reference numerals.

DESCRIPTION OF THE PREFERRED EMBODIMENT

Figure 1:
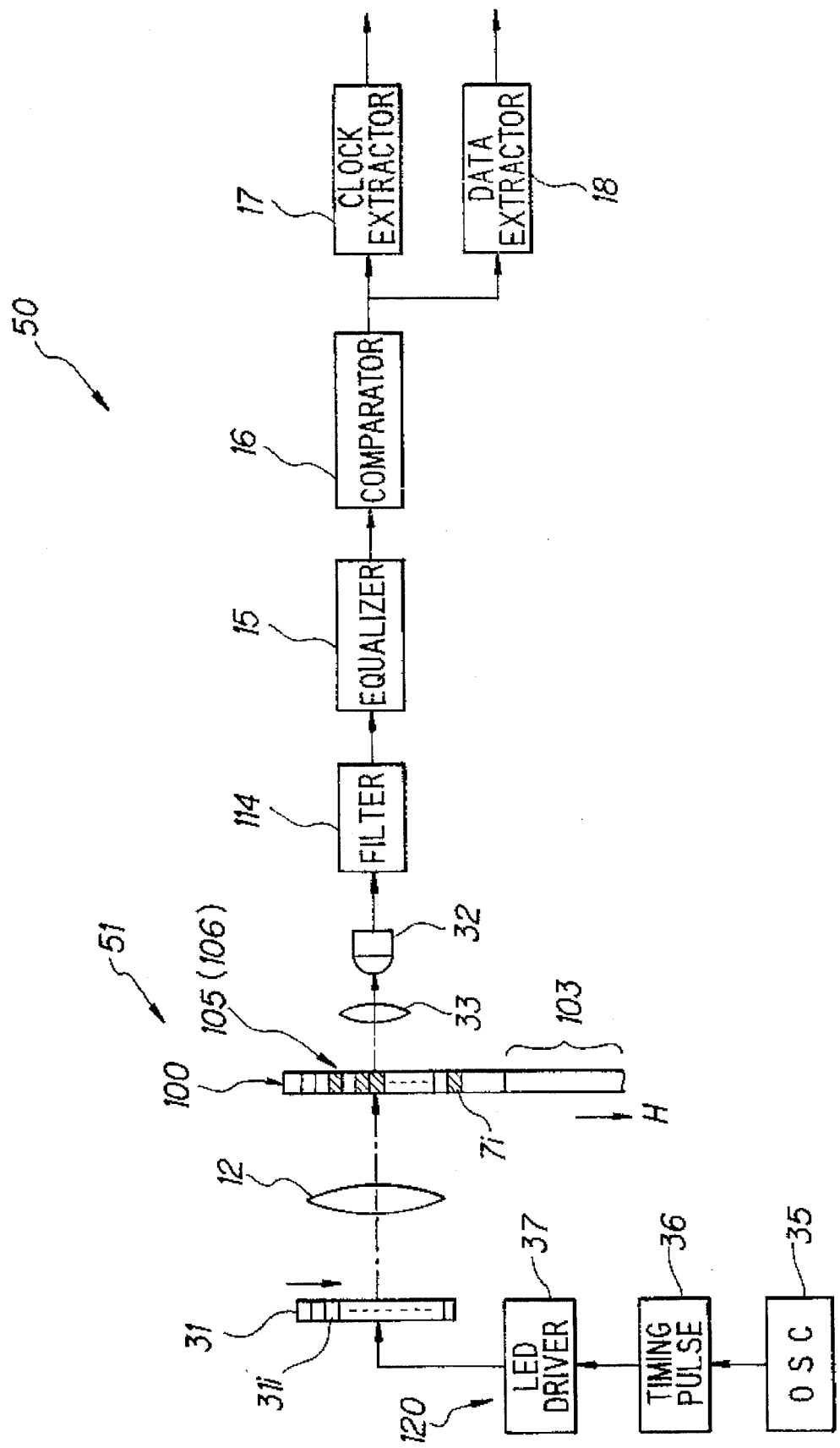
FIG. 1 is a diagram of an apparatus for reproducing digital information from a movie film according to an embodiment of the present invention.
Figure 8:
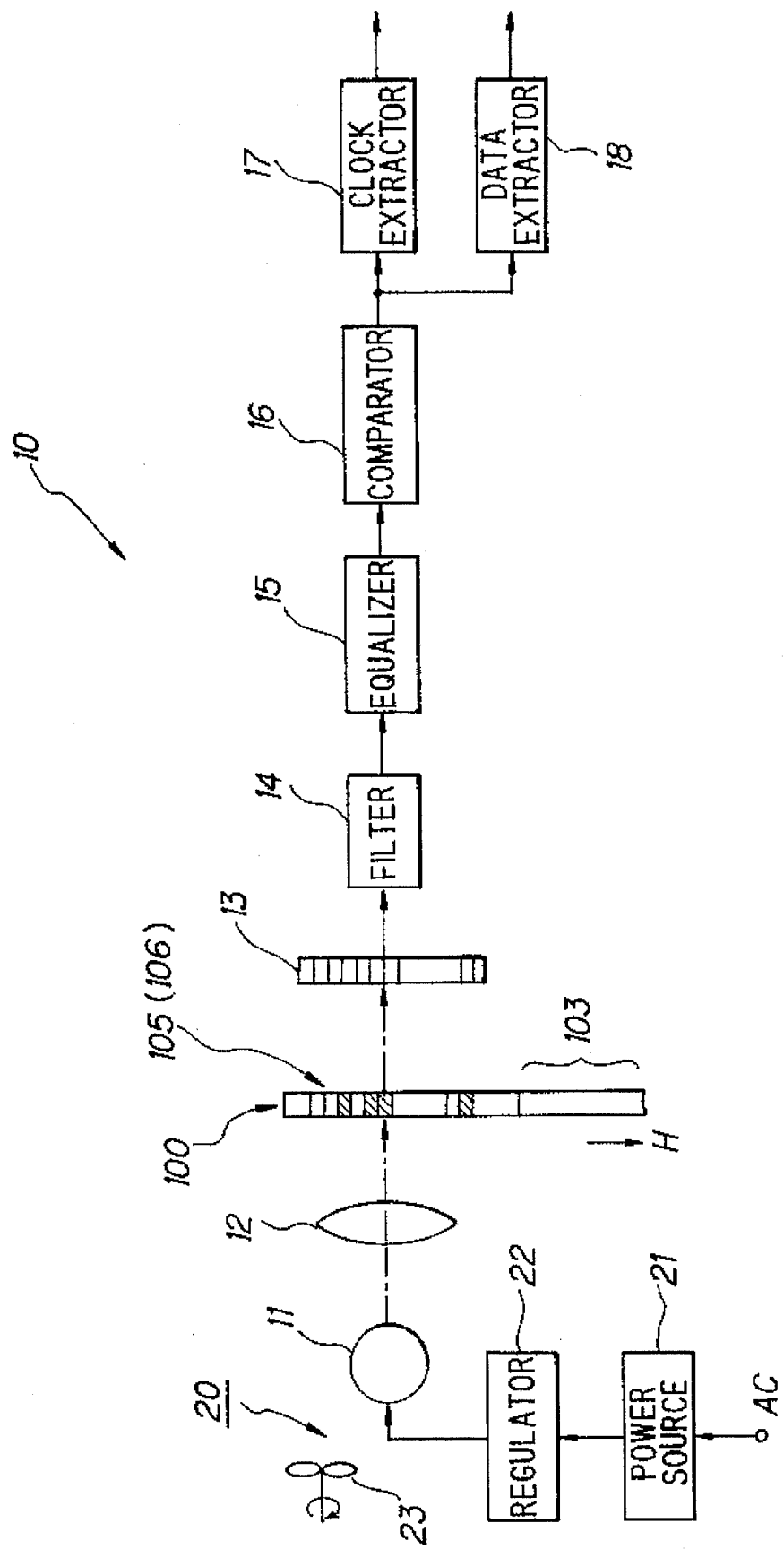
FIG. 8 is a diagram of a portion of a movie film digital information reproducing apparatus according to the prior art.

An apparatus for reproducing digital information from a motion picture or movie film according to an embodiment of the present invention is illustrated in FIG. 1. As shown therein, such apparatus 50 includes a lens 12, an equalizer 15, a comparator 16, a clock extractor 17 and a data extractor 18 which are substantially similar to those of the apparatus 10 of FIG. 8 and, accordingly, will not be further described herein. As further shown in FIG. 1, the apparatus 50 further includes a light source 31, a light receiving element 32, a lens 33, a filter 114 and a driver 120.

Figure 6:
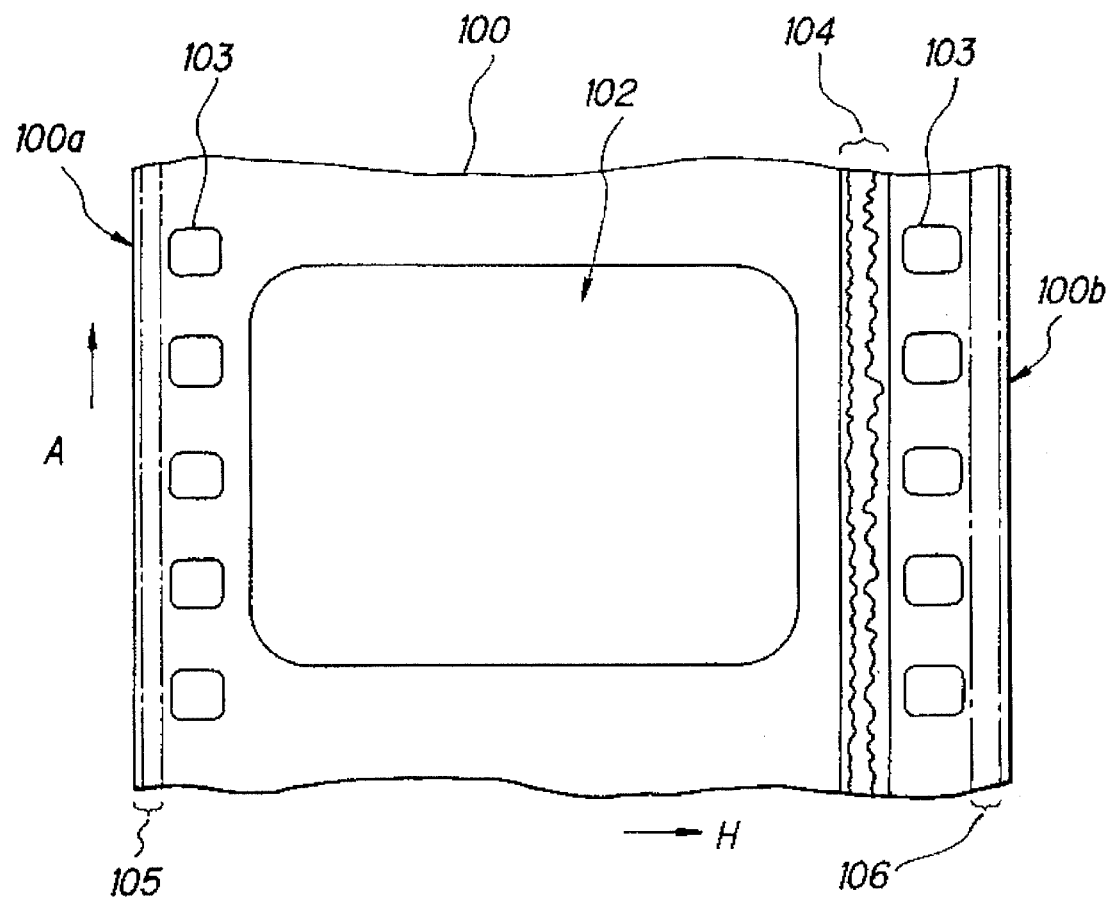
FIG. 6 is a diagram illustrating a portion of a movie film having analog and digital audio tracks.

The apparatus 50 is adapted to be used with movie film having recorded thereon digital or analog and digital audio information such as the movie film 100 of FIG. 6. As previously described, the movie film 100 has analog audio information recorded in its analog audio track 104 and digital audio information having the same content as that of the analog audio information recorded in either one or both of the first and second digital audio tracks 105 and 106, respectively. Such analog and digital audio tracks may be used for ensuring compatibility with existing systems as previously described. Alternatively, such analog and digital audio tracks may be utilized to correct or compensate for signal errors such as signal dropout. As an example, audio information from the digital audio track(s) may be read out until a signal dropout is detected, whereupon the system changes over so as to read out the audio information from the analog audio track. When such dropout is no longer detected, the system returns to reading out the digital audio information from the digital audio track(s).

Four channels of audio information may be recorded in each of the first and second digital audio tracks 105 and 106, respectively, thereby totaling eight channels of audio information. However, alternatively, audio information may be recorded in either of the first and second digital audio tracks 105 and 106. Signals corresponding to each channel may be supplied to a respective speaker (not shown).

Figure 7A:
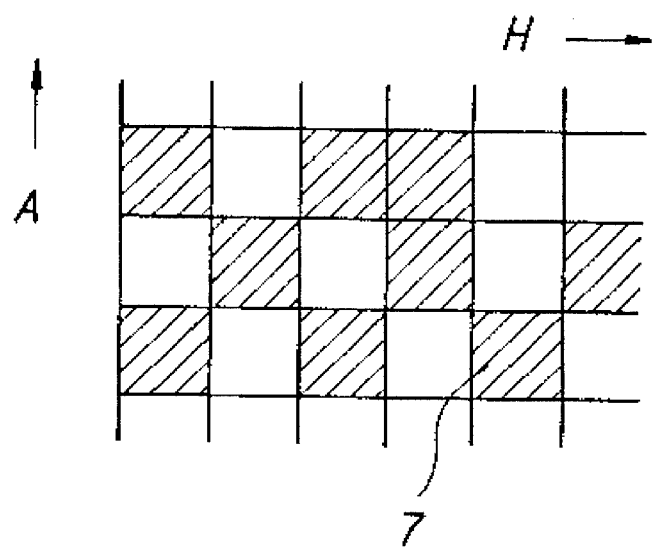
FIG. 7A is a diagram illustrating an example of digital audio information recorded on movie film.
Figure 7B:
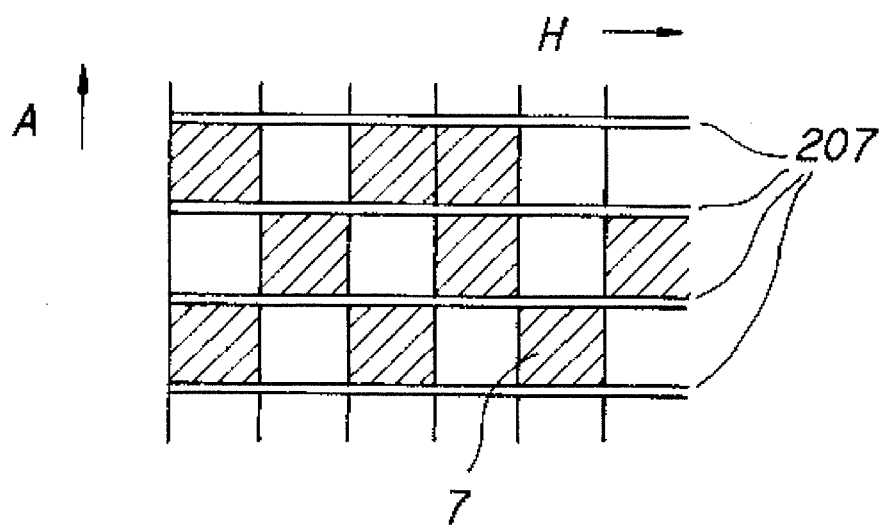
FIG. 7B is a diagram illustrating an example of digital audio information recorded on movie film having gaps between adjacent rows of digital audio information.

The digital audio information is recorded in the first and second digital tracks 105 and 106 in a predetermined manner, such as by using square pits as illustrated in FIG. 7A, and by arranging the pits in units of column, as hereinbefore described. Alternatively, the pits may have other shapes, such as round and so forth. Further, a space or gap 207 may be provided between adjacent rows of pits as shown in FIG. 7B. As a result, the rows do not "touch" each other or are not contiguous in the film running direction A.

The light source 31 is preferably a linear light source having a plurality of light elements which may be separately lit. Specifically, the linear light source 31 preferably includes a plurality of light emitting diodes (LED) or similar such elements. These LED elements have their lit states controlled sequentially by drive pulses or switching pulses fed thereto by the driver 120, as hereinafter more fully described. The speed at which such LED elements are respectively lit is determined by the frequency of the drive pulses. Such LED elements are preferably one-dimensional type light emitting elements which are less expensive and have a longer operating life than the halogen lamp of the apparatus 10 of FIG. 8.

The light receiving element 32 preferably has a single light receiving portion. Such light receiving element may be a photodetector or photodiode (PD). Such photodiode may have a square shape with dimensions of approximately 24 mm by 24 mm. As compared to the CCD of the apparatus 10 of FIG. 8, the light receiving element 32 has a lower cost, a smaller size and a longer operating life.

An optical or light beam from the light source 31 is directed through the movie film 100 to the light receiving element 32. More specifically, the optical beam from the light source 31 is focused by the lens 12 so as to be directed or converged towards the desired one or ones of the first and second digital audio tracks 105 and 106, respectively, of the movie film 100. The optical beam from the movie film 100 is directed towards the lens 33, which is interposed between the movie film 100 and the light receiving element 32. As a result, the optical beam from the movie film 100 is focused by the lens 33 so as to be properly directed upon the light receiving element 32. The light receiving element 32 is adapted to convert the received light into a corresponding electrical signal and to supply such signal therefrom.

The output signal from the light receiving element 32 is supplied to the filter 114, as shown in FIG. 1. Such filter 114, which may be a low pass filter, is adapted to restrict the frequency band resulting from the aforementioned over-sampling to a working frequency band. An output from the filter 114 is supplied to the equalizer 15 so as to be processed through the equalizer, the comparator 16, the clock extractor 17 and the data extractor 18 in a manner similar to that previously described with reference to the apparatus 10 of FIG. 8.

Figure 3:
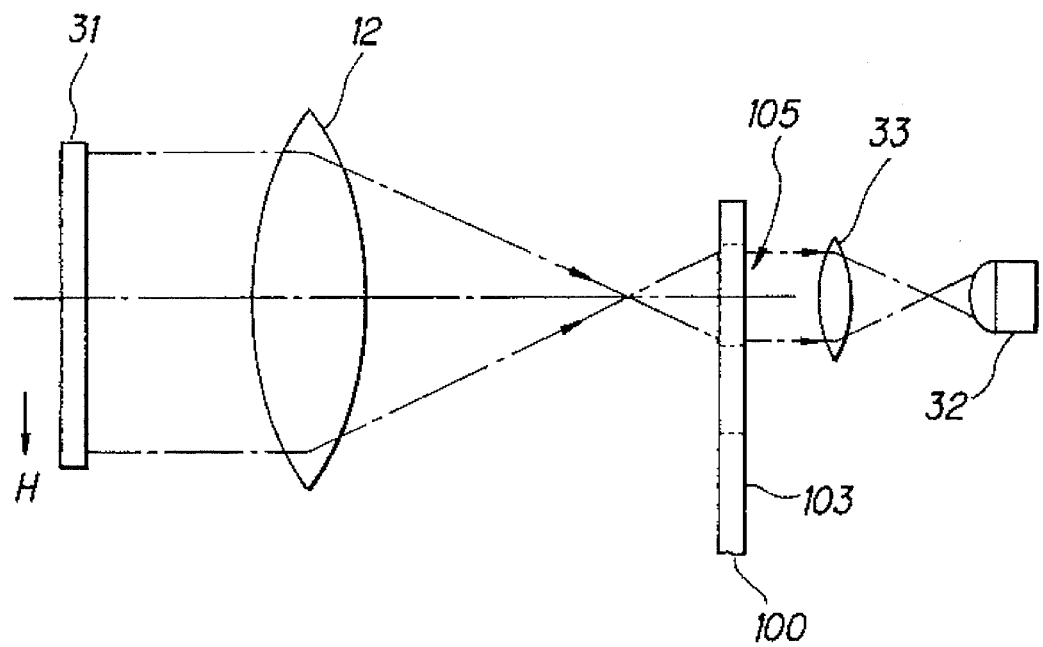
FIG. 3 is a diagram of a portion of the apparatus of FIG. 1 to which reference will be made in explaining the optical reading of digital information from the movie film.

The light source 31 and the light receiving element 32 are arranged such that the audio or pit information recorded in a digital audio track, such as the first digital audio track 105, may be entirely read out by the linear light source 31 having the plurality of light elements and received by the single light receiving element 32, as shown in FIG. 3. The optical or light beam received by the light receiving element 32 is modulated by the pit information recorded in the first digital audio track 105. As a result, information is read out from the digital audio track according to the pit column information by the light source 31 and directed to the light receiving element 32 so as to be converted thereat into corresponding electrical signals.

The digital information recorded in each pit in the digital audio track 105 (or 106) is optically read out by focusing the beam from at least one light element of the light source 31 through the respective pit and upon the light receiving element 32. The beam from an adjacent light element reads out the information recorded in the next pit. Such procedure for reading out information continues sequentially for each pit in each line of the respective digital audio track. The light elements are sequentially extinguished after being utilized for reading out pit information.

Although a beam from one light element of the light source 31 may be utilized to read out the information in each pit, in the preferred embodiment, the digital audio information recorded in each pit is read out by utilizing a plurality of light elements. In such situation, the pit information of one line of the digital audio track may be entirely read out by the light elements belonging to one column. Such use by a plurality of light elements produces so-called over-sampling as hereinbelow more fully described.

Figure 2:
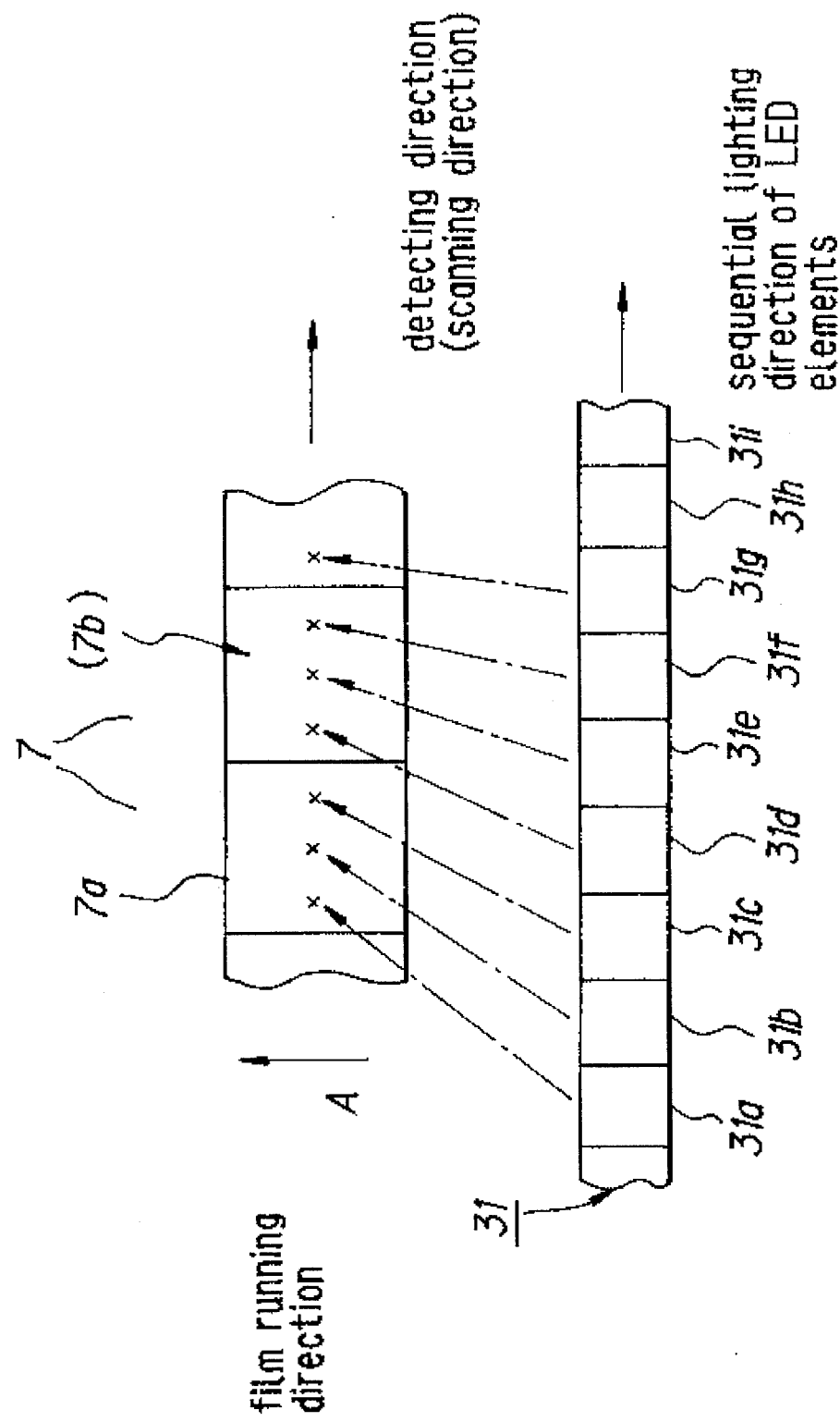
FIG. 2 is diagram of a portion of the apparatus of FIG. 1 illustrating the relationship between a linear light source and pit information in the movie film.
Figure 4:
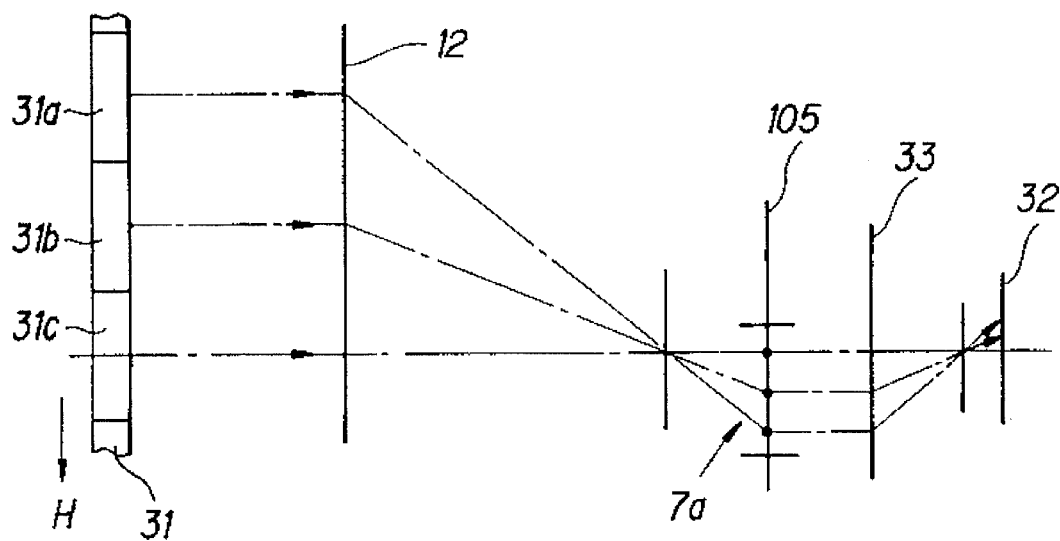
FIG. 4 is a diagram illustrating a portion of the apparatus of FIG. 1 to which reference will be made in explaining the optical reading of digital information from the movie film utilizing a plurality of light elements.
Figure 5:
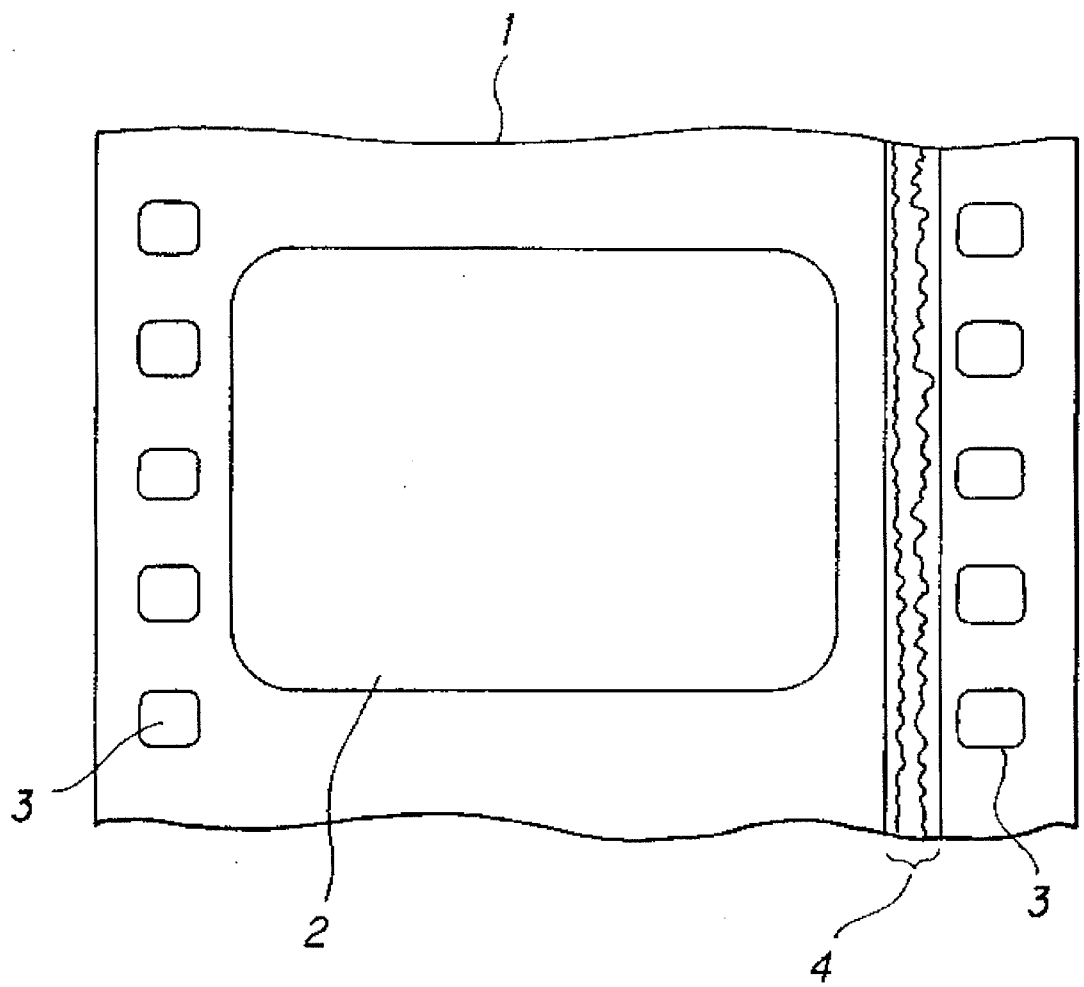
FIG. 5 is a diagram illustrating a portion of a conventional movie film having an analog audio track.

FIGS. 2 and 4 illustrate a situation in which pit information is read out by over-sampling. As shown therein, three light elements, such as 31a, 31b and 31c, are arranged so as to provide three respective light beams which are irradiated on a pit 7a of the first digital audio track 105. In a similar manner, three light beams from three light elements, such as 31d, 31e, 31f and 31g, 31h, 31l and so forth, respectively irradiate pits 7b and so forth of the first digital audio track 105. In this situation, the LED 31 includes approximately three times as many light elements 31a, 31b and so forth (31i; wherein i indicates an arbitrary integer or range of integers such as from 1 to N where N is the number of light elements or LED's) as the number of pits of one line recorded in the digital audio track 105. The focal points of the respective light elements associated with one pit are selected to be equidistantly displaced as, for example, illustrated in FIGS. 2 and 4.

As a result, the digital audio information (or pit information) of one line recorded in the digital audio track 105 is over-sampled by the single light receiving element 32. Such procedure continues for each line in the first digital audio track 105. As is to be appreciated, audio information from the second digital audio track 106 may be similarly read out or reproduced therefrom.

Although in FIG. 2 each of the pits 7a, 7b and so forth is shown to have an area larger than that of each of the elements 31i, such relationship between the areas is not intended to be an accurate representation thereof and, in fact, is intended only for explanatory convenience. In actuality, each of the elements 31i is typically larger than each of the pits 7. For example, each of the pits 7 may have a size of approximately 18 μm×18 μm, whereas each of the elements 31i may have a size of approximately 130 μm×130 μm.

The digital audio information is entirely read out from the digital audio track(s) by controlling the lighting operations of the light elements of the light source 31 so as to sequentially focus respective optical beams from the individual elements upon the single light receiving element 32. As a result, the bit column information recorded in each line of the digital audio track or tracks may be entirely converted into corresponding electrical signals. Such operation for each line is performed in synchronism with the movement or take-up rate of the movie film 100.

As described hereinbefore, the driver 120 is utilized for activating or controlling the lighting operations of the light elements of the light source 31 and, as such, the optical reading operation. The driver 120 includes an oscillator 35, a timing pulse generator 36 and a LED driver 37, as shown in FIG. 1. The oscillator 35 is adapted to produce a fundamental clock signal and to supply such clock signal to the timing pulse generator 36 which, in turn, produces an element switching drive signal. This element switching drive signal is supplied to the LED driver 37 which, as a result, sequentially supplies an output drive signal to the light elements 31i for a predetermined period of time. As a result, each light element is activated or lit for a predetermined period of time in a sequential manner as, for example, from the left light element to the right light element as in FIG. 2.

As is to be appreciated, since the elements 31i are each sequentially lit for a time period while being supplied with the drive signal, the operation thereof is substantially equivalent to that in which a point light source is moved at a predetermined speed in the line direction so as to read out the corresponding pit information. Accordingly, and as an alternative, a point light source may be utilized in such a manner to read out the pit information.

The light source 31 and the light receiving element 32 of the apparatus 50 each have a relatively small size and low weight. As a result, the entire optical reading portion 51 of the apparatus 50 may be constructed so as to have a relatively small size. Further, the driver 120 may be constructed by utilizing a relatively simple circuit such as the oscillator 35 and, as such, may have a small size and be relatively inexpensive to fabricate. Furthermore, since the light source or LED 31 generates a relatively small amount of heat while operating, a cooling fan is not required, thereby resulting in a cost, weight and size savings as compared to the apparatus 10 of FIG. 8.

Although, as previously described, the light source 31 is preferably a linear light source having a plurality of LED's, the present invention is not so limited. For example, the light source 31 may be another type of linear light source if such source can control the lighting state for an element unit. Further, although, as previously described, the light receiving element 32 may be a photodiode, the present invention is not so limited and any other similar type of device may be utilized which has a single light receiving portion sized to receive an optical beam from one of the light elements.

Furthermore, the digital information recorded in the first and second digital audio tracks 105 and 106, respectively, can be reproduced or read out by utilizing two optical reading portions 51, such as that of the apparatus 50, for each of the digital audio tracks. Alternatively, a single such optical reading portion may be utilized for reading the digital information from both of the digital audio tracks 105 and 106.

Thus, the present invention provides a technique for reproducing an optically recorded digital audio signal from a movie film which utilizes a linear light source adapted to have its lighting state controlled at an element unit and a light receiving element in an optical reading portion. As previously described, the linear light source may include a plurality of LED's and the light receiving element may include a photodiode, or the like, which are relatively small and inexpensive and have a relatively long operating life. Further, due to the relatively simple construction of the peripheral circuit(s) associated with the optical reading portion 51 of the apparatus 50, such as those of the driver 120, the optical reading portion including the peripheral circuit(s) can be fabricated simpler than that of the prior art as, for example, that illustrated in FIG. 8. As a result, the present apparatus 50 may be constructed so as to have a relatively small size and a relatively long operating life and at a relatively low cost.

Although an illustrative embodiment of the present invention and modifications thereof have been described in detail herein, it is to be understood that this invention is not limited to this precise embodiment and modifications, and that other modifications and variations may be affected therein by one skilled in the art without departing from the scope and spirit of the inventions as defined by the appended claims.

What is claimed is:

1. An apparatus for optically reproducing a digital audio signal formed as a plurality of pits in at least one track on a motion picture film, each of said pits corresponding to a respective digital bit of data, said apparatus comprising:

a linear light source having a plurality of light elements arranged so that light from at least one of said light elements is irradiated on each of said pits;

means for sequentially lighting each of said light elements of said linear light source; and a single light receiving device located on a side of said motion picture film opposite said linear light source for receiving the light from said linear light source through said motion picture film and for converting the received light into a corresponding electrical signal.

2. An apparatus according to claim 1, wherein said plurality of light elements of said linear light source are a plurality of light emitting diodes.

3. An apparatus according to claim 2, wherein said light receiving device is a photodetector.

4. An apparatus according to claim 1, wherein said means for sequentially lighting includes an oscillator for generating a clock signal and drive means receiving said clock signal for generating a drive signal and for supplying said drive signal to said linear light source so as to cause said light elements to be sequentially lit.

5. An apparatus according to claim 4, wherein said means for sequentially lighting is cooled without utilizing a fan.

6. An apparatus according to claim 1, wherein light from more than one of said light elements is irradiated on each of said pits so as to produce an over-sampling of the data corresponding to each of said pits.

* * * * *